(12) United States Patent
Ruggeri et al.

(10) Patent No.: US 12,097,488 B2
(45) Date of Patent: Sep. 24, 2024

(54) PROCESS OF STEAM REFORMING WITH LOW CARBON DIOXIDE EMISSIONS

(71) Applicant: WOOD ITALIANA S.R.L., Corsico (IT)

(72) Inventors: Fabio Ruggeri, Corsico (IT); Luca Mancuso, Corsico (IT); Luigi Sangalli, Corsico (IT)

(73) Assignee: WOOD ITALIANA S.R.L. (IT)

( * ) Notice: Subject to any disclaimer, the term of this patent is extended or adjusted under 35 U.S.C. 154(b) by 503 days.

(21) Appl. No.: 17/616,557

(22) PCT Filed: Jun. 5, 2020

(86) PCT No.: PCT/IB2020/055320
§ 371 (c)(1),
(2) Date: Dec. 3, 2021

(87) PCT Pub. No.: WO2020/245792
PCT Pub. Date: Dec. 10, 2020

(65) Prior Publication Data
US 2022/0234019 A1    Jul. 28, 2022

(30) Foreign Application Priority Data

Jun. 6, 2019 (IT) .......................... 102019000008280

(51) Int. Cl.
*B01J 8/06* (2006.01)
*B01J 19/24* (2006.01)
*C01B 3/38* (2006.01)

(52) U.S. Cl.
CPC ........... *B01J 8/067* (2013.01); *B01J 19/2425* (2013.01); *C01B 3/382* (2013.01);
(Continued)

(58) Field of Classification Search
CPC ................... B01J 8/067; B01J 19/2425; B01J 2208/00194; C01B 2203/0288; C01B 2203/0475; C01B 2203/0833; C01B 3/382

See application file for complete search history.

(56) References Cited

U.S. PATENT DOCUMENTS 2,336,879 A    12/1943  Mekler
5,621,155 A *   4/1997  Benham ................... C10L 1/18
                                             518/703

(Continued)

FOREIGN PATENT DOCUMENTS

EP    0926097 A1   6/1999
WO    9429013 A1  12/1994

*Primary Examiner* — Matthew J Merkling
(74) *Attorney, Agent, or Firm* — The Belles Group, P.C.

(57) ABSTRACT

A steam reforming process to produce synthesis gas from hydrocarbons comprises: a first steam reforming step, wherein a gas stream of hydrocarbon feedstock is supplied into a first reforming section comprising at least a first gas heated reformer, where steam reforming reactions take place forming a partially reformed effluent; a second steam reforming effluent, wherein the partially reformed effluent leaving the first reforming section is supplied to a second steam reforming section comprising at least a second reformer, where in a radiant chamber outside the tubes, an air combustion takes place; the second reformer is a gas heated reformer.

4 Claims, 3 Drawing Sheets

(52) U.S. Cl.
CPC ............... *B01J 2208/00194* (2013.01); *C01B 2203/0288* (2013.01); *C01B 2203/0475* (2013.01); *C01B 2203/0833* (2013.01)

(56) References Cited

U.S. PATENT DOCUMENTS

| | | | |
|---|---|---|---|
| 7,517,373 B2 | 4/2009 | Sakai et al. | |
| 2002/0006968 A1* | 1/2002 | Abbott | C10G 2/30 |
| | | | 518/704 |
| 2006/0135629 A1* | 6/2006 | Abbott | C01B 3/382 |
| | | | 518/702 |
| 2010/0022668 A1* | 1/2010 | Allam | C01B 13/0229 |
| | | | 518/703 |
| 2010/0047160 A1* | 2/2010 | Allam | C01B 3/48 |
| | | | 422/187 |
| 2022/0194789 A1* | 6/2022 | Christensen | C01B 3/52 |

* cited by examiner

PROCESS OF STEAM REFORMING WITH LOW CARBON DIOXIDE EMISSIONS

CROSS-REFERENCE TO RELATED APPLICATIONS

This patent application is a U.S. national stage application under 35 U.S.C. § 371 of PCT Application No. PCT/IB2020/055320, filed on Jun. 5, 2020, which claims priority from Italian patent applications no. 102019000008280 filed on Jun. 6, 2019. The entire disclosure of the aforementioned priority applications are incorporated herein by reference in their entireties.

TECHNICAL FIELD

The present invention relates to a steam reforming process, in particular for producing synthesis gas, ensuring a high reduction of carbon dioxide emissions, higher than 90%.

BACKGROUND ART

As known, synthesis gas (syngas) is a gas mixture essentially formed by hydrogen ($H_2$) and carbon monoxide (CO) and containing, in smaller amounts, methane ($CH_4$), carbon dioxide ($CO_2$), nitrogen and other inert gases.

The synthesis gas is commonly produced by means of a hydrocarbon (such as methane) steam reforming reaction, performed in a reforming reactor (reformer).

Generally the steam reforming process is performed in a tubular reactor composed of one or more rows of tubes arranged inside a combustion chamber, which provides heat for developing the reaction (which is highly endothermic) by means of heat exchange mainly by radiation. The tubular reactor can be possibly preceded by an adiabatic pre-reforming step and it is normally preceded by a charge purification step. Downstream of the reforming reactor it is known arranging a section for converting the carbon monoxide by a shift reaction, followed by a section for cooling the synthesis gas and purifying the obtained hydrogen, normally comprising a so-called Pressure Swing Adsorption (PSA) unit.

The known steam reforming processes are not completely satisfactory and have some drawbacks.

Firstly, the $CO_2$ emissions related to the process are very significant: for each ton of hydrogen produced by this method, 9 tons of $CO_2$ are produced as well.

Furthermore, the energy efficiency of the process, if integrated with a $CO_2$-capturing step, is not satisfactory as regards emission reduction, if it is performed on the gas conversion section. Actually due to the combustion section importing combustible gas the maximum capture percentage is limited to about 65% of the total $CO_2$ produced. For the alternative fume-capturing system this limit is overcome and it is possible to obtain a capture up to 90-95%, with resulting dramatic overall efficiency losses in generating the energy necessary for purification, together with an increase of installation costs, which can actually lead to doubling the overall cost of the plant.

DISCLOSURE OF INVENTION

It is an object of the present invention to provide a steam reforming process, in particular for producing synthesis gas, which overcomes the herein noted drawbacks of the prior art.

It is a further object of the invention to provide a process that is particularly advantageous as regards $CO_2$-capturing efficacy and efficiency, using in particular a reforming reactor, used as a supplement to the traditional steam reformer, which is not affected by even relevant thermal expansions and which is not only fully efficient and reliable but also of simple and cost-effective construction and installation. Such reactor employs as heating means the gas effluent coming from the ultra-high temperature steam reformer (beyond 920° C.), allowing to keep a syngas at the outlet of the integrated section with a methane content that is lower than 2%, this result non being obtainable, cost-effectively, with the present integrated installations of the state of the art.

In particular, it is an object of the invention to provide a process that is advantageous in terms of operation costs and installation requirements, and that further allows for a high $CO_2$ emission reduction (higher than 90%, approximately between 92 and 98%).

Such result can be obtained by coupling a specific equipment (gas heated reformer), described in the following paragraphs, into an innovative process chain which by providing a double shift section at medium and low temperature with intermediate cooling and a $CO_2$-capturing unit allows to obtain a highly decarburized syngas (hydrogen content even beyond 97% prior to the PSA purification section). The possibility to use this syngas as a combustible for the reforming section (instead of methane or fuel gas) allows to obtain an overall very high $CO_2$ capture, higher that at least 90% and even up to 98%, a result which cannot be reached by the current state of the art.

The present invention thus relates to a steam reforming process, in particular for producing synthesis gases, as defined in the enclosed claim 1, and also, as regards the preferred additional characters, in the dependent claims.

The invention thus provides a steam reforming process which allows to avoid supplying combustible gas and generating exceeding high pressure steam, reducing the gas to be treated and improving the quality of the leaving synthesis gas and thus being particularly advantageous in terms of functioning costs and installation requirements, in addition to emission reduction.

Furthermore, the process of the invention is particularly advantageous in that it employs a reactor which, simply, cost-effectively and fully efficiently, avoids the problems typically related to high thermal expansions.

A steam reforming reactor substantially comprises a vessel which houses a bundle of tubes supported by a pair of tubesheets. A process fluid that is subject to one or more reactions passes through the tubes; a heating means provides heat to the tubes, for example through the circulation of a heating fluid which lightly touches the outside of the tubes in the region between the tubesheets.

In the steam reforming reactors a significant differential thermal expansion takes place between tubes and tubesheets supporting them and delimit the passage area of the heating fluid which provides heat to tubes and, therefore to the process fluid.

A situation such as the one just described occurs, for example, in steam reforming reactors where hydrocarbon reforming takes place for producing synthesis gas. Similar problems can be in any case found in other applications where significant differential thermal expansions occur.

In fact, the process fluid passing through the tubes is a reactant mixture containing hydrocarbons and steam and it is sent through the tubes, which are filled with a catalyst and are heated outside by a heating means, generally a hot gas which lightly touches the outside of the tubes.

The tubes of a reforming reactor have a considerable length, typically several metres, and are subject to significant temperature variations. Consequently, tubes are subject, in use, to significant thermal expansions in a longitudinal direction, typically in the order of several centimetres. As tubes are constrained to tubesheets, the thermal expansion may cause damages.

In order to overcome the problem, it is known providing the tube ends with devices that allow for a differential expansion.

The known systems may not however be completely satisfactory, in particular they may be complicated, not completely efficient or poorly reliable, relatively expensive during the production and installation step.

According to the invention, in the reforming process a reactor having characteristics such to avoid the problems related to tube thermal expansion is employed.

BRIEF DESCRIPTION OF THE DRAWINGS

Further features and advantages of the present invention will become clear from the following description of an embodiment thereof, with reference to the figures in the appended drawings, wherein.

BEST MODE FOR CARRYING OUT THE INVENTION

Figure 1:
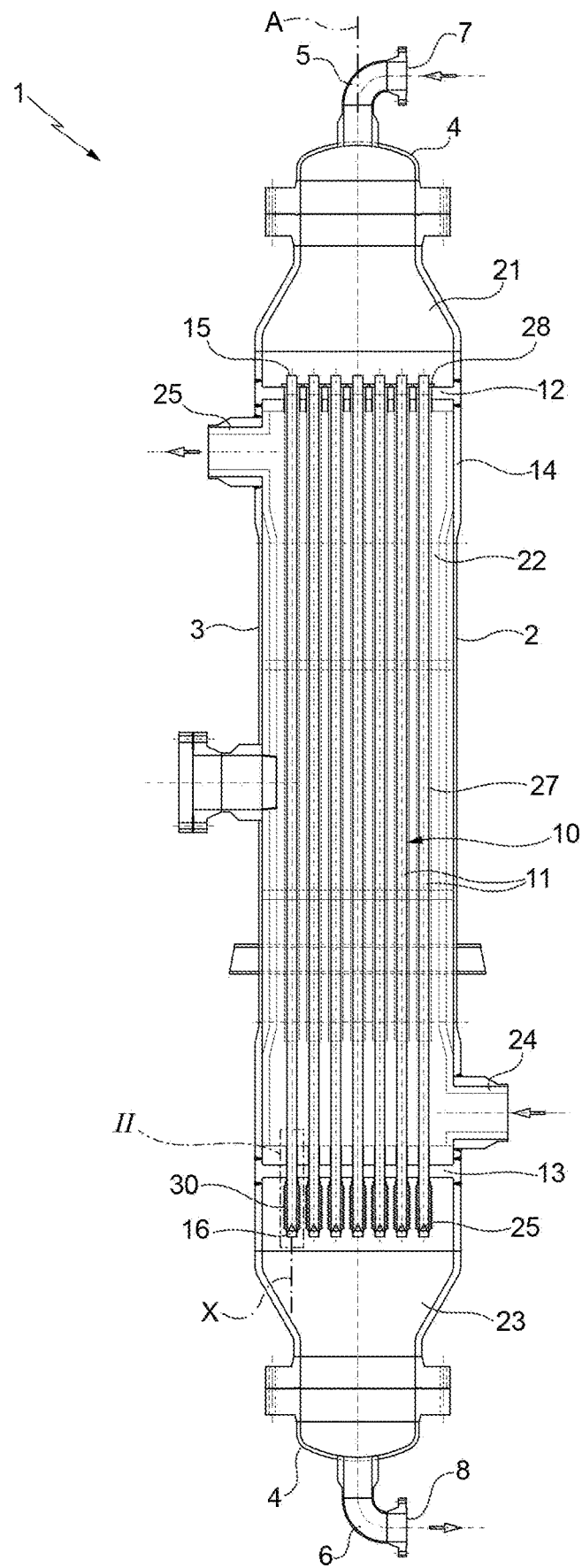
FIG. 1 is a longitudinal section schematic view of a reactor, in particular a steam reforming reactor, to be used in the reforming process according to the invention.

In FIG. 1 a reactor, in particular a reforming reactor (or reformer), is generally indicated by 1. In the herein described non-limiting example, the reactor 1 is used in particular for steam reforming hydrocarbons for producing synthesis gases.

The reactor 1 comprises an outer vessel 2 extending along and about a longitudinal axis A.

In particular the vessel 2 has a substantially cylindrical central portion 3 and two axially opposite end caps 4, provided with respective connectors 5 defining an inlet 7 and an outlet 8 for a process fluid passing through the reactor 1.

The reactor 1 then comprises a tube bundle 10 formed by a plurality of reaction and thermal exchange tubes 11, that extend parallel between each other and with the axis A inside the vessel 2 and precisely of the central portion 3.

The tubes 11 are supported by an upper tubesheet 12 and a lower tubesheet 13, placed at respective opposite longitudinal ends of the portion 3 and fixed to a side wall 14 of the vessel 2.

Tubes 11 extend along respective longitudinal axes X, parallel to axis A of the reactor 1, between respective longitudinal opposite ends 15, 16 respectively joined to the upper tubesheet 12 and to the lower tubesheet 13.

Tubesheets 12, 13 are transversal and substantially perpendicular to the axis A and delimit inside the reactor 1: a process fluid supply zone 21; a process and heat exchange zone 22; and a process fluid extracting zone 23.

The process fluid supply zone 21 is placed above the upper tubesheet 12 and it is provided with the inlet 7 for supplying the process fluid.

The process and heat exchange zone 22 is placed between the two tubesheets 12, 13 and has an inlet duct 24 and an outlet duct 25 for a heating fluid, communicating with the inside of the reactor 1 through the vessel 2 side wall 14.

The inlet duct 24 is placed near and above the lower tubesheet 13, while the outlet duct 25 is placed near and below the upper tubesheet 12.

The process fluid extracting zone 23 is placed below the lower tubesheet 13 and it is provided with the outlet 8 from which the process fluid leaves the reactor 1.

The tubes 11 extend through the zone 22 and project axially from the tubesheets 12, 13 in the zones 21, 23 at the respective ends 15, 16 that are open to allow the passage of the process fluid.

If, as in the herein described example, the reactor 1 is intended for hydrocarbon steam reforming, tubes 11 are filled with a suitable catalyst, for example a nickel-based standard catalyst; tubes 11 are advantageously provided with supporting elements 25, placed inside tubes 11 near the respective ends 16 and shaped so as to support the catalyst.

The zone 22 can optionally house deflectors or other conveying elements to guide at least partially the heating fluid along preferential paths and improve the heat exchange between the heating fluid and the tubes 11.

For example, the tubes 11 are provided with respective sheath tubes 27 placed about respective tubes 11 and defining about the tubes 11 annular ducts wherein the heating fluid passes through.

The sheath tubes 27 extend from the upper tubesheet 12 until a pre-established height above the inlet duct 24; the sheath tubes 27 are closed on top, near the upper ends of tubes 11 and tubesheet 12, and are open at the bottom to let the heating fluid enter.

The tubes 11 are fixed and optionally welded to the upper tubesheet 12, for example by means of respective flanges 28 radially projecting from the ends 15 of the tubes 11 and rest on an upper face of the tubesheet 12 in the zone 21.

The tubes 11 are connected to at least one of the tubesheets 12, 13, for example to the lower tubesheet 13, by means of respective expansion devices 30, which allow the ends 16 of tubes 11 to slide axially with respect to the tubesheet 13 to compensate longitudinal thermal expansions of the tubes 11.

Figure 2:
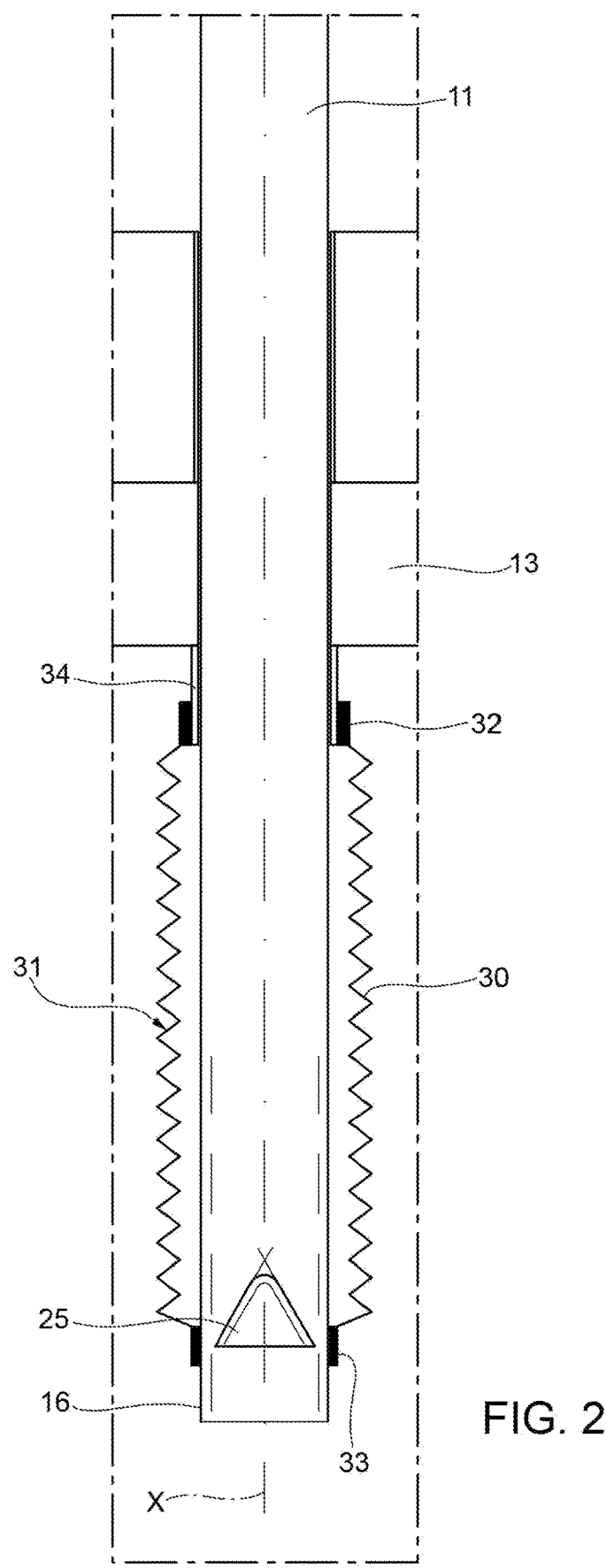
FIG. 2 is an enlarged scale view of the detail II in FIG. 1.

In particular, as shown in greater detail in FIG. 2, each device 30 comprises a tubular sealed metal compensator 31 placed about the end 16 of the tube 11 and along the tube 11. Each tube 11 is provided with an individual sealed metal compensator 31 acting on that tube 31 regardless of devices 30 and other tubes 11.

In the shown non-limiting embodiment, though not necessarily, the sealed metal compensator 31 is substantially conformed as a bellows and extends along and about the axis X of the respective tube 11 and has an axial series of undulations, i.e. a series of annular ridge portions and annular throats alternate with one another.

The sealed metal compensator 31 is made of metal material, preferably multi-ply metal material (i.e. consisting of a plurality of plies of metal material layered and welded to one another).

The sealed metal compensator 31 is provided with a pair of opposite end portions 32, 33, placed at respective axially opposite ends of the sealed metal compensator 31 and fluid-sealingly joined respectively to the tubesheet 13 and to an end 16 of a tube 11. In particular, the opposite end portions 32, 33 of each sealed metal compensator 31 are respectively sealed to the tubesheet 13 and to an end 16 of a tube 11.

In the illustrated embodiment, though not necessarily, the end portion 32 is welded to a connection element 34 projecting from a lower face of the tubesheet 13.

Preferably, the end portions 32, 33 are defined by respective cylindrical collars about the axis X, and fitted about and welded to respective cylindrical contact surfaces of the connection element 34, which is in turn defined by a cylindrical sleeve, and of the end 16 of the tube 11.

According to an aspect of the invention, the reactor 1 is used in a hydrocarbon steam reforming process to produce synthesis gas.

The reactor 1 is therefore supplied with a process fluid containing a hydrocarbon feedstock, such as natural gas or methane, and steam.

The process fluid is supplied to the reactor 1 at high temperature and pressure through the inlet 7; in zone 21, the process fluid penetrates the tubes 11, crossing them top-down passing through the zone 22 where it receives heat from the heating fluid; passing through the tubes 11 the process fluid comes into contact with the catalyst and is subject to reforming reactions forming hydrogen. A reforming effluent leaves the tubes 11, substantially containing hydrogen, steam, methane and carbon oxides, and passes through the zone 23 and then leaves the reactor 1 through the outlet 8.

The heating fluid enters the zone 22 from the inlet duct 24, crosses the zone 22 bottom-up exchanging heat with the tubes 11, and is thus removed through the outlet duct 25.

Thanks to the particular constructive feature of the reactor 1, it can be advantageously integrated in a process layout where a steam reformer, in which the heat for the reforming reactions is provided by an external heating fluid, is associated with a gas heated reformer (GHR), in which the reformed effluent leaving the reformer is instead used as a heating fluid to provide heat to the process fluid to be reformed.

In particular, the reactor 1 is advantageously used as a gas-heated reformer in a steam reforming process for producing synthesis gases ensuring a high reduction of carbon dioxide emissions, higher than 90%, as hereinafter described in detail with reference to the diagram in FIG. 3.

Figure 3:
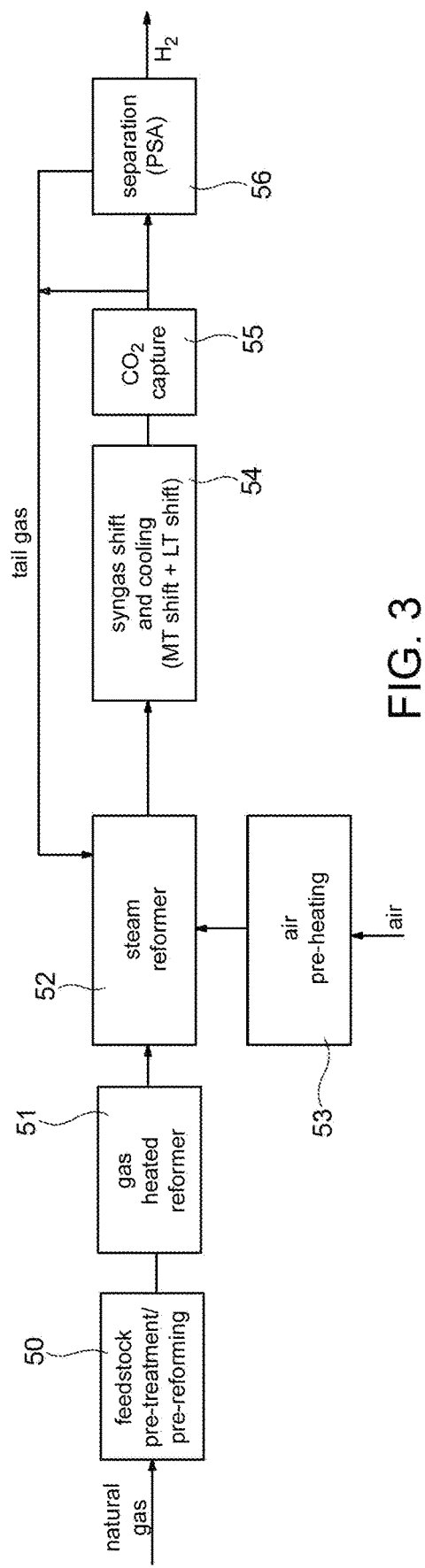
FIG. 3 is a block diagram which illustrates the steam reforming process, in particular for producing synthesis gas, according to the invention and using of the reactor of FIG. 1.

In the process scheme illustrated in FIG. 3, a hydrocarbon feedstock gas stream, such as natural gas o methane, after being optionally pre-treated in a pre-treating or pre-reforming section 50, is supplied to a first reforming section 51, comprising a gas-heated reformer, where a steam reforming process takes place forming a partially reformed effluent, mainly containing hydrogen (H2), carbon monoxide (CO), water (H2O) and residual methane (CH4).

In the gas heated reformer, the heat necessary for the reforming reactions is supplied by a fraction of the partially reformed effluent leaving the same reformer.

The partially reformed effluent leaving the section 51 is sent to a second steam reforming section 52 where, in a radiant chamber placed outside the catalytic tubes, a combustion with air, optionally pre-treated in an air pre-treating section 53 (in particular, an air pre-treating section, where air is preheated), is performed, to have a higher carbon monoxide and hydrogen concentration and a lower concentration of residual methane.

From section 52 a synthesis gas is obtained which is then treated: in a synthesis gas shift and cooling section 54, where carbon monoxide and water present in the synthesis gas react to give hydrogen and carbon dioxide; in a CO2-capturing section 55, where carbon dioxide is removed from the synthesis gas; and finally in a separating section 56, for example comprising a PSA (pressure swing adsorption) unit, to obtain a high concentration hydrogen gas stream.

Advantageously, the synthesis gas shift and cooling section 54 comprises a medium temperature shift unit and a low temperature shift unit connected in series; or a shift unit operating in a low temperature isotherm mode.

Tail gases extracted from the separating section 56 are recirculated to the reformer of section 52 together with a portion (adapted to fulfil the thermal demand of the steam reformer) of the decarburized syngas leaving the CO2-capturing section 55.

In case an intermediate purity hydrogen is required (97%-98% of hydrogen content) instead of a high purity hydrogen, it would be possible to remove the PSA section 56.

The described invention allows to avoid supplying combustible gas and generating exceeding high pressure steam, reducing the gas to be treated and improving the quality of the leaving synthesis gas and thus being particularly advantageous in terms of functioning costs and installation requirements, in addition to emission reduction.

It is understood that changes and variants can be brought to the herein described and illustrated process without departing from the scope of the enclosed claims.

The invention claimed is:

1. A steam reforming process for producing synthesis gas from hydrocarbons, comprising:
   a first steam reforming step, in which a gas stream of hydrocarbon feedstock, optionally pre-treated in a pre-treatment or pre-reforming section, is supplied to a first reforming section comprising at least a first reformer, where steam reforming reactions take place forming a partially reformed effluent; said first reformer being a gas heated reformer in which the heat necessary for the reforming reactions is provided by a fraction of the partially reformed effluent leaving said first gas heated reformer and constituting a heating fluid to provide heat to the feedstock to be reformed;
   a second steam reforming step, wherein the partially reformed effluent leaving the first reforming section is supplied to a second steam reforming section comprising at least a second catalytic tube reformer, which comprises a plurality of catalytic tubes, where, in a radiant chamber outside the catalytic tubes, a combustion with air, optionally pre-treated in an air pre-treatment section, is performed;
   wherein:
   the synthesis gas leaving the second steam reforming section is sent to: a synthesis gas shift and cooling step in a synthesis gas shift and cooling section, where carbon monoxide and water present in the synthesis gas react to give hydrogen and carbon dioxide; a CO2-capturing step in a CO2-capturing section, where carbon dioxide is removed from the synthesis gas; a separating section, to obtain a high concentration hydrogen gas flow;
   the synthesis gas shift and cooling section comprises a medium temperature shift unit and a low temperature shift unit connected in series and operating at respective different temperatures with intermediate cooling;
   tail gases extracted downstream of the CO2-capturing section and/or from the separating section are recirculated to the second steam reforming section.

2. The process according to claim 1, wherein the separating section comprises a PSA (pressure swing adsorption) unit.

3. The process according to claim 1, wherein the first reformer consists of a reactor comprising a vessel and a tube bundle composed of a plurality of reaction and heat exchange tubes, extending inside the vessel along respective parallel longitudinal axes and supported by an upper tubesheet and a lower tubesheet; the tubes being connected to at least one of said tubesheets, by respective expansion devices, configured to allow respective ends of the tubes to slide axially with respect to said tubesheet to compensate longitudinal thermal expansions of the tubes; each device comprising a respective tubular sealed metal compensator arranged about the end of a tube and along the tube and having a tubular lateral wall extending along and about the axis of the respective tube and having an axial series of undulations, i.e. a series of annular ridge portions and annular throats alternate with one another; the sealed metal compensator being made of multi-ply metal material, consisting of a plurality of plies of metal material layered and welded to one another.

4. The process according to claim 3, wherein the sealed metal compensator is provided with a pair of opposite end portions, arranged at respective axially opposite ends of the sealed metal compensator and welded to the tubesheet and to the end of the tube respectively and defined by respective collars, cylindrical about the axis and fitted about and welded to respective cylindrical contact surfaces of a connection element projecting from a lower face of the tubesheet and defined by a cylindrical sleeve, and of the end of the tube.

* * * * *